(12) United States Patent
Hoeptner

(10) Patent No.: US 8,146,888 B1
(45) Date of Patent: Apr. 3, 2012

(54) STOPPER SLEEVE ASSEMBLY INTO STANDARD VALVE

(76) Inventor: Herbert W. Hoeptner, Gilroy, CA (US)

( * ) Notice: Subject to any disclaimer, the term of this patent is extended or adjusted under 35 U.S.C. 154(b) by 483 days.

(21) Appl. No.: 12/288,763

(22) Filed: Oct. 24, 2008

(51) Int. Cl.
*F16K 5/00* (2006.01)
(52) U.S. Cl. .................................. 251/310; 251/344
(58) Field of Classification Search .............. 251/344, 251/310, 309, 312; 137/454.5, 454.2
See application file for complete search history.

(56) References Cited

U.S. PATENT DOCUMENTS

| 313,549 | A | * | 3/1885 | Stebbins | 137/454.6 |
| 688,298 | A | * | 12/1901 | Foss | 251/164 |
| 3,166,097 | A | * | 1/1965 | Hinderer et al. | 251/310 |
| 3,430,919 | A | * | 3/1969 | Frazier | 251/283 |
| 3,814,120 | A | * | 6/1974 | Moen | 137/454.6 |
| 4,395,018 | A | * | 7/1983 | Moen | 251/310 |
| 4,699,358 | A | * | 10/1987 | Iqbal | 251/310 |
| 4,700,928 | A | * | 10/1987 | Marty | 251/310 |
| 4,842,012 | A | * | 6/1989 | Sheen | 251/310 |
| 6,119,719 | A | * | 9/2000 | Viegener | 137/454.5 |

* cited by examiner

*Primary Examiner* — John Fristoe, Jr.
*Assistant Examiner* — Andrew J Rost
(74) *Attorney, Agent, or Firm* — William W. Haefliger

(57) ABSTRACT

In a valve, the combination comprises a valve body defining an annular seat, and porting at upstream and downstream sides of the seat; a valve operating handle and stem; a tubular part connected into the body and defining a first side opening facing toward one of the sides; a tubular stopper sleeve received within the tubular part and having an open end facing the seat; and a second side opening rotatable by the stem into and out of registration with the first side opening whereby flow through the valve and stopper sleeve is established when the second side opening registers with the first side opening, and flow through the valve is blanked when the second side opening is rotated out of registration with the first side opening.

9 Claims, 3 Drawing Sheets known valve

STOPPER SLEEVE ASSEMBLY INTO STANDARD VALVE

BACKGROUND OF THE INVENTION

This invention relates generally to valves such as faucet type valves, and more particularly to valves which will turn full on and full off in response to turning of a handle through an angle less than one 360° full turn, and typically less than or about one quarter turn, i.e. 90°.

There is need for improvements in such valves, and particularly over ball valves, which inherently are difficult to seal and/or seat in open and/or closed positions. Such valves tend to leak due to their ball configurations. There is need for improvements in faucet type valves, generally, and which include stoppers that seat and/or seal in open and/or closed positions after less than 180° rotation; and there is need for improvements in structure, function and results are now provided by the valve disclosed herein.

SUMMARY OF THE INVENTION

It is a major object of this invention to provide an improved valve meeting the needs as referred to above. Basically, the improved valve includes:

a) a valve body defining an annular seat, and porting at upstream and downstream sides of the seat, b) a valve operating handle and stem, c) a tubular part connected into the body and defining a first side opening facing toward one of said sides, d) a tubular stopper sleeve received within the tubular part and having i) an open end facing said seat, ii) a second side opening rotatable by the stem into and out of registration with said first side opening, e) whereby flow through the valve and stopper sleeve is established when said second side opening registers with said first side opening, and flow through the valve is blanked when said second side opening is rotated out of registration with said first side opening.

Such a combination is well suited for installation into a faucet body after removal of ball stopper, to provide better valve functioning.

Another object is to provide an improved valve configuration as referred to, wherein the stopper stem consists of an elastomeric material, providing enhanced sealing surface area.

Yet another object is to provide a valve wherein the stopper sleeve is carried by or integral with the turnable stem of the valve.

A further object is to provide a valve having an elastomeric stopper sleeve as referred to, which is turnable between open and closed positions in response to about ¼ turning of the rotatable valve stem, and provides for good sealing of the sleeve in open and closed positions. In this regard, a lower seal may be provide at the lower open end of the sleeve, and an upper seal may be provided at or proximate the upper end of the sleeve, and between a tubular part within which the sleeve is rotatable, and a valve body.

An additional object is to provide a valve of the type described, and characterized by simplicity and reliability in structure and function.

A further object includes assembling the referenced stopper sleeve into the body of a valve that defines an interior annular seat, not needed for sleeve sealing, and to allow flow passage through that seat into the sleeve, for flow control.

These and other objects and advantages of the invention, as well as the details of an illustrative embodiment, will be more fully understood from the following specification and drawings, in which:

DRAWING DESCRIPTION

DETAILED DESCRIPTION

Figure 1:
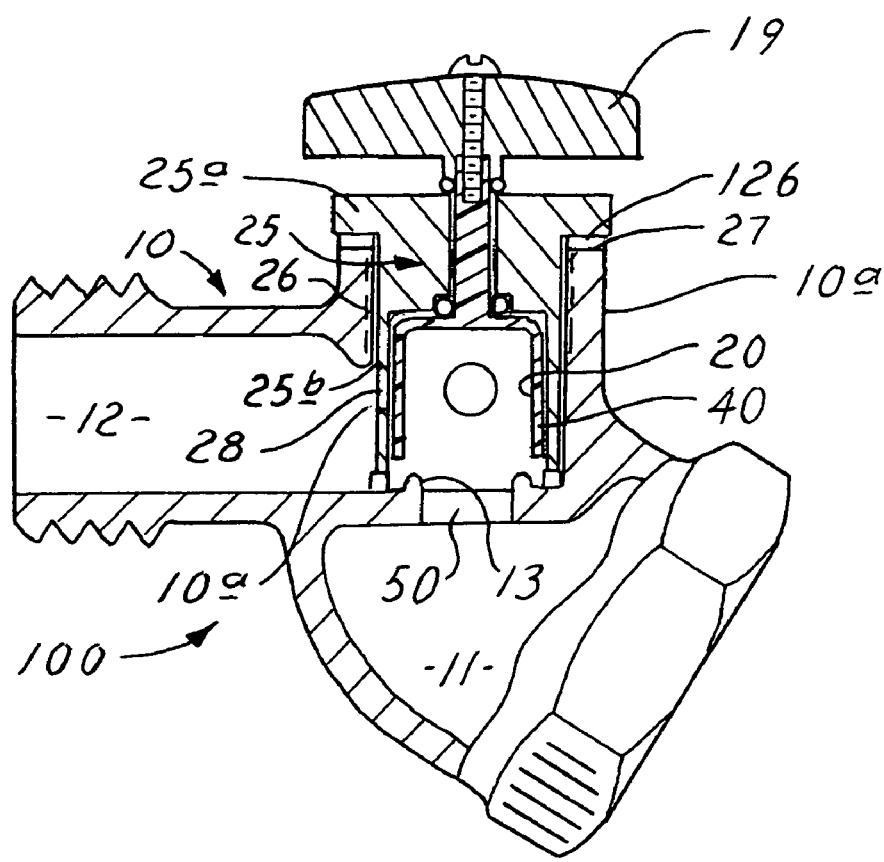
FIG. 1 is a vertical section taken through a preferred and improved valve embodying the invention.
Figure 2:
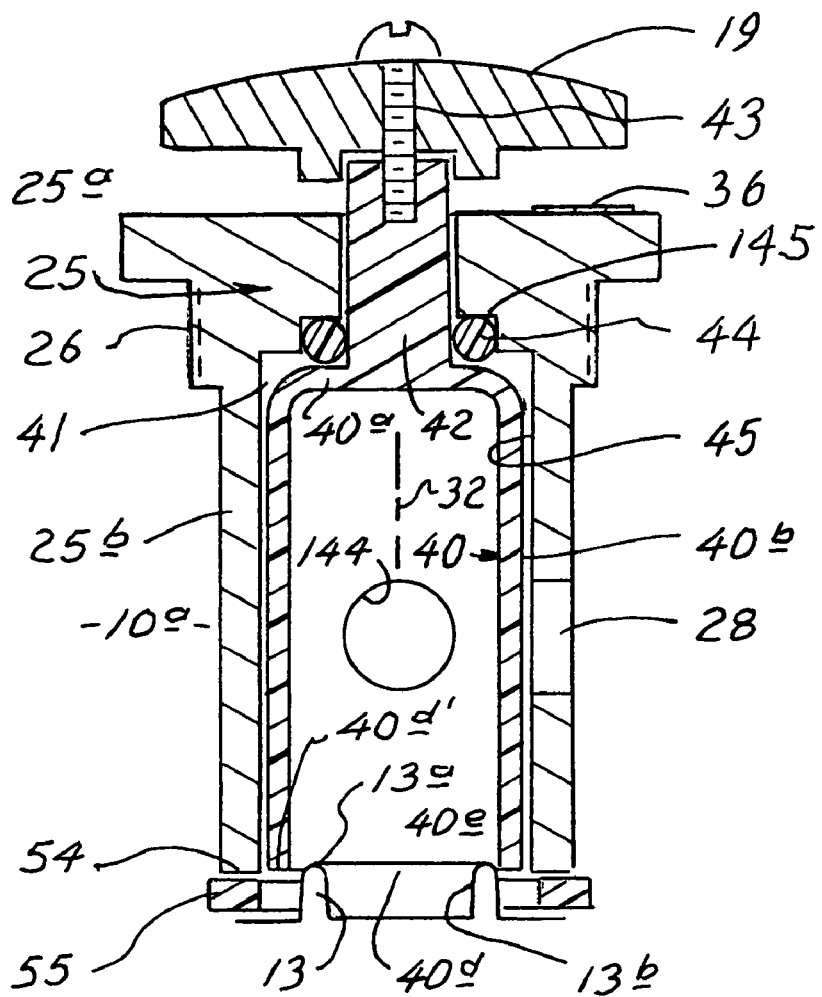
FIG. 2 is an enlarged section taken through the stopper sleeve and associated structure.
Figure 3:
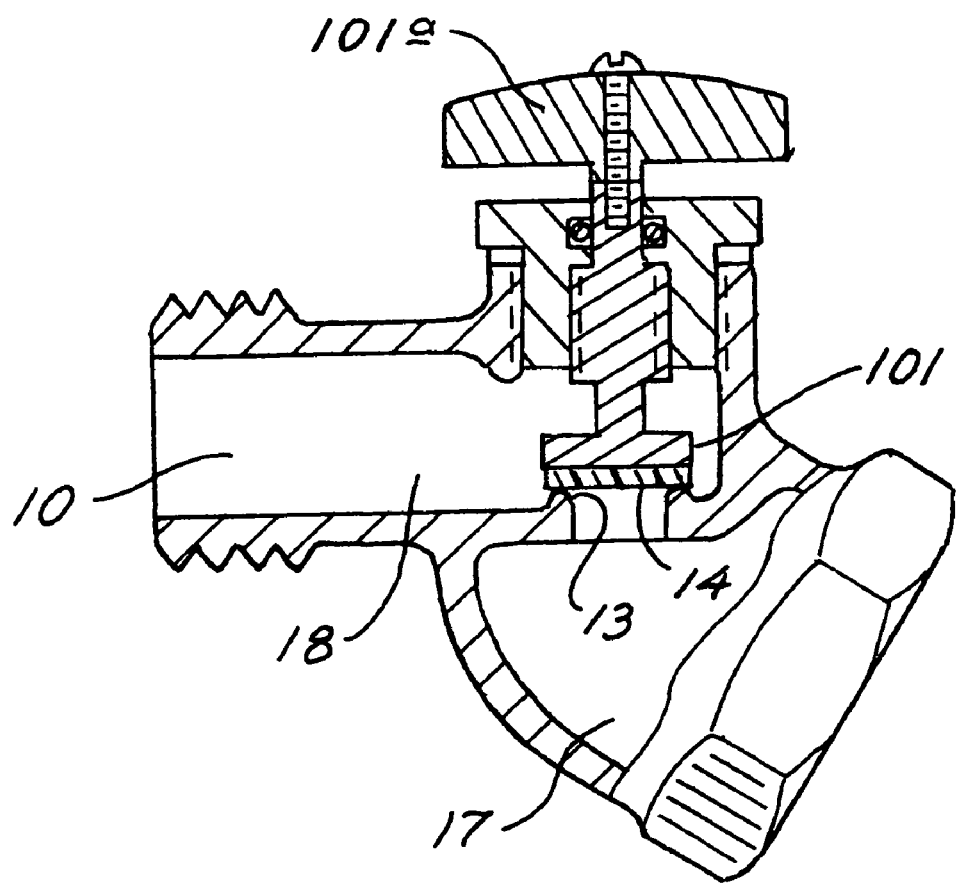
FIG. 3 shows a standard, known valve.

In FIGS. 1 and 2, the illustrated valve 100 includes a valve body 10 having inlet and outlet ports 11 and 12 and an annular seat 13. That seat, in a valve 100 as shown in FIG. 3, is engagable by a stopper disc 14, and multiple turns of handle 15 in FIG. 3 are required to open the rotor 101 via rotation of handle 101a so as to achieve full flow between valve upstream and downstream zones 17 and 18. As contrasted with this, the valve 100 of FIGS. 1 and 2 is fully openable in response to only a quarter turn (90°) of handle 19. Further, stopper 20 in FIGS. 1 and 2 and its turning handle 19 can be substituted into an existing valve of the type shown in FIG. 3, to convert it into an improved valve, fully openable by one quarter turn of the handle.

Referring again to FIGS. 1 and 2, a tubular part 25 is threadably connected at 26 into the valve body part 10a, and an annular seal is provided at 126 between head 25a of 25, and the body shoulder 27. Part 25 has a tubular extension 25b that extends downwardly into body chamber 10a, with the lower annular end of 25b extending proximate or about upward projection 13a, for orientation. Extension 25b defines a first side wall through opening 28 facing toward one of the valve body flow passages or sides 11 and 12, as shown. The angular positioning of opening 28 about vertical axis 32 is determined by rotation of part 25, and tightening against seal 126. A radial marker 36 may be provided on head 25a, and in an axial plane passing centrally through concealed opening 28, to indicate alignment of that opening with passage 12, as part 25 is rotated.

As shown, a tubular stopper sleeve 40 is provided within a chamber or cavity 41 within extension 25b, and in coaxial relation therewith. The upper end of the sleeve is closed by end wall 40a, and a stem 42 connects with 40a and with the handle 19, as at 43. An annular sealing O-ring 44 is located in a groove 145 in part 25, to downwardly seal against the top of end wall 40a. Accordingly, the stopper sleeve is sealingly rotatable in 41 by the handle, and preferably ¼ turn (90°) to open and close the valve.

For this purpose, the sleeve has a second side wall through opening 144 rotatable into and out of registration with the first side opening 28. Those two openings may preferably be circular, and of the same general size. In FIG. 2 position, the openings are out of registration, and opening 144 is blanked by the cylindrical bore 45 of the extension 25b. The sliding fit between the bore 45 and the outer cylindrical surface 40b of rubber part 40 (expanded by water pressure) is sufficiently close as to prevent objectionable leakage from 144 to 28, in closed position as seen in FIG. 2, but without inhibiting turning of the sleeve. Sleeve 40 may consist of a relatively hard elastomer, and tubular part 25 and its bore 45 may consist of metal, such as brass. Other metals or plasticsare usable.

The bottom end at 40d of the sleeve is open, as shown, to receive the flow from body passage 50; and the lower annular extent 40d' extends closely about the standard valve seat 13. The seat bore 13b is large enough to pass flow without substantial restriction. The lower end 54 of 25 engages washer 55 to establish a seal against leakage from sleeve interior 40e to passage 12.

Accordingly, flow through the valve and substituted stopper sleeve is established when said second side opening 144 registers with first side opening 28, and flow through the valve is blanked when side opening 144 is rotated 90°, or about 90°, into FIG. 1 position.

What is claimed is:

1. In a valve, the combination comprising
   a) a valve body defining an annular seat, and porting at upstream and downstream sides of the seat,
   b) a valve operating handle and stem,
   c) a tubular part connected into the body and defining a first side opening facing toward one of said sides,
   d) a tubular stopper sleeve consisting of rubber received within the tubular part and having
      i) an open end facing said seat,
      ii) a second side opening rotatable by the stem into and out of registration with said first side opening,
   e) whereby flow through the valve and substituted sleeve is established when said second side opening registers with said first side opening, and flow through the valve is blanked when said second side opening is rotated out of registration with said first side opening,
   f) said tubular part and sleeve being free of engagement with any O-ring seal or seals below the uppermost extents of said first and second side openings and above lowermost extent of said part, the sleeve consisting of rubber and being sufficiently thin to be bodily expansible by fluid pressure so as to have sliding engagement along its length with a metallic bore defined by said tubular part, the sleeve continuing with the same thinness to terminate between the seat and lowermost extent of said tubular part.

2. The combination of claim 1, wherein the sleeve has a closed end operatively connected with said stem, to be rotated by the handle about an axis passing through an opening defined by the seat.

3. The invention of claim 2 wherein the sleeve defines a cylinder having an extension bounding the seat.

4. The combination of claim 1 wherein the tubular part consists of metal with a bore having a sliding fit with an outer expansible cylindrical surface defined by said rubber sleeve.

5. The combination of claim 1 including a lower seal between said tubular part and said body at the lower end of said part, and an upper seal between said tubular part and said body, proximate the upper end of said sleeve.

6. The combination of claim 4 wherein the sleeve and said part remain co-axial in all positions of the sleeve, the rubber sleeve defining an upper end wall, overlying the interior of the sleeve, said part defining an annular groove overlying said end wall, there being an O-ring seal located in said groove and downwardly sealing against the top of said sleeve end wall, for sealing off between said part and said end wall.

7. The method that includes providing the combination of claim 1, and also including the step of adjusting the position of said part in said body, and relative to said body, thereby to position the sleeve open end in proximity to said seat, but out of sealing engagement therewith.

8. The combination of claim 1 wherein the sleeve has a closed position in which said sleeve side opening is blanked by a side wall of said part, and an open position wherein the sleeve side opening is in registration with said part side opening.

9. In a valve, the combination comprising
   a) a valve body defining an annular seat, and porting at upstream and downstream sides of the seat,
   b) a valve operating handle and stem,
   c) a tubular part connected into the body and defining a first side opening facing toward one of said sides,
   d) a tubular stopper sleeve consisting of rubber received within the tubular part and having
      i) an open end facing said seat,
      ii) a second side opening rotatable by the stem into and out of registration with said first side opening,
   e) whereby flow through the valve and stopper sleeve is established when said second side opening registers with said first side opening, and flow through the valve is blanked when said second side opening is rotated out of registration with said first side opening,
   f) the rubber sleeve defining an upper end wall, overlying the interior of the sleeve, said part defining an annular groove overlying said end wall, there being an O-ring seal located in said groove and downwardly sealing against the top of said sleeve end wall, for sealing off between said part and said end wall,
   g) said O-ring seal also sealingly engaging a stem annular end portion integral with the sleeve upper end wall,
   h) the rubber sleeve being sufficiently uniformly thin along its length at and above said open end and expansible by fluid pressure to have sliding fit with a bore defined by said part, said sliding fit being sufficiently close as to prevent objectionable leakage in valve closed position, but without inhibiting turning of the sleeve,
   i) lowermost thin extent of the sleeve bounding annular extent of said seat, proximate the lowermost extent of said part.

* * * * *